UNITED STATES PATENT OFFICE.

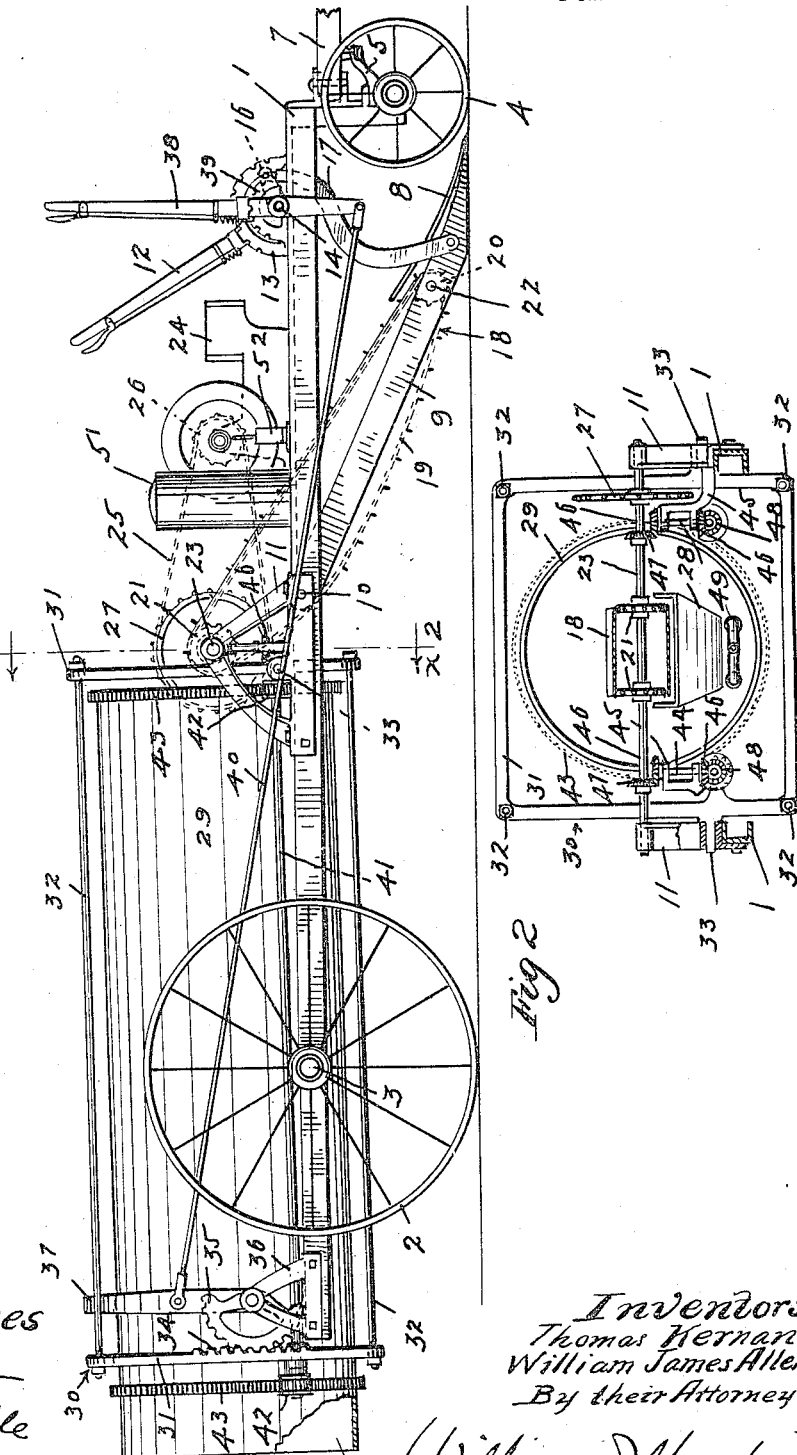

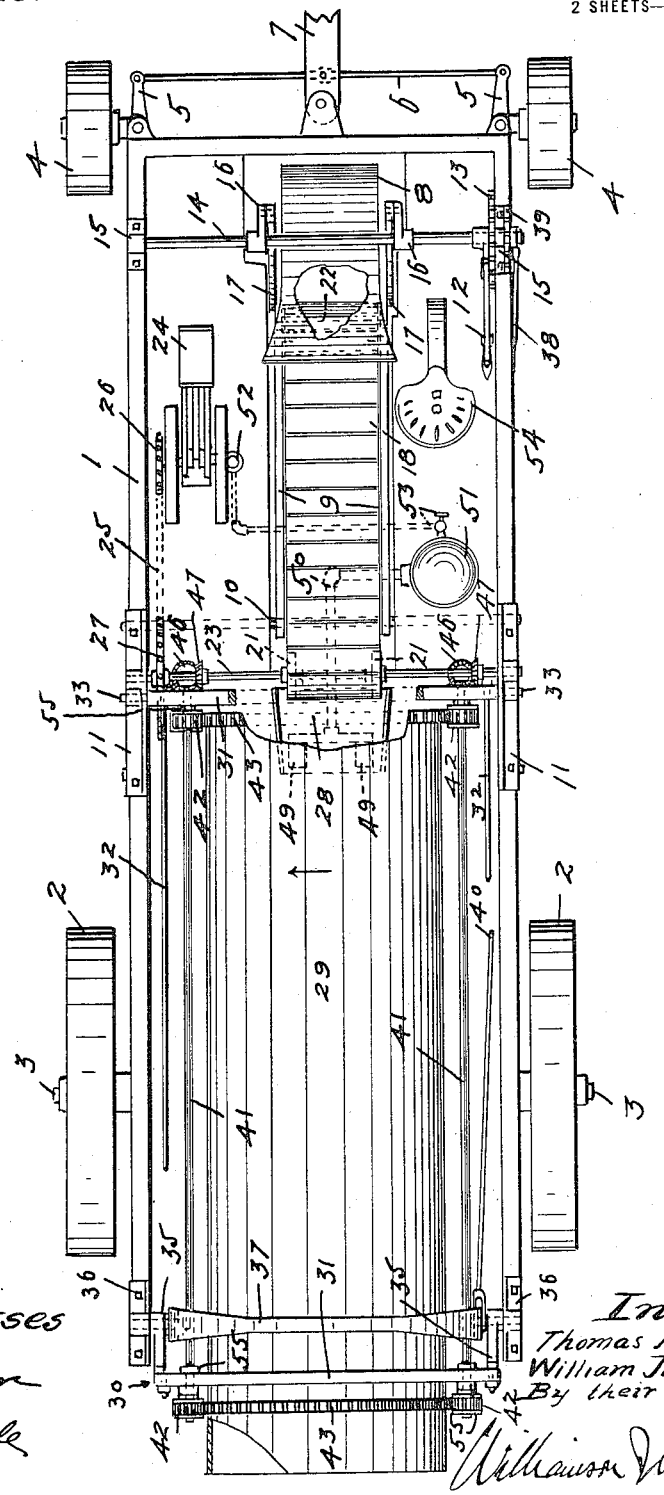

THOMAS KERNAN AND WILLIAM J. ALLEN, OF ST. CLOUD, MINNESOTA.

APPARATUS FOR TREATING THE SOIL.

1,209,848.  Specification of Letters Patent.  Patented Dec. 26, 1916.

Application filed February 23, 1915. Serial No. 9,837.

*To all whom it may concern:*

Be it known that we, THOMAS KERNAN and WILLIAM J. ALLEN, citizens of the United States, residing at St. Cloud, in the county of Stearns and State of Minnesota, have invented certain new and useful Improvements in Apparatus for Treating the Soil; and we do hereby declare the following to be a full, clear, and exact description of the invention, such as will enable others skilled in the art to which it appertains to make and use the same.

Our invention relates to an improved apparatus for treating the soil for the purpose of killing quack grass, wild oats, mustard, Russian thistles and other noxious plant growth, together with their seed, and for destroying all insects, worms, grasshoppers, and the like, together with their eggs, and larvæ, contained in the soil.

To the above end, generally stated, the improved apparatus consists of the novel devices and combination of devices hereinafter described and defined in the claim.

In the accompanying drawings, which illustrate the improved apparatus, like characters indicate like parts throughout the several views.

Referring to the drawings: Figure 1 is a side elevation of the improved machine, some parts being broken away; Fig. 2 is a view partly in end elevation and partly in transverse vertical section taken on the line $X^2 X^2$ of Fig. 1; and Fig. 3 is a plan view of the improved machine, some parts being broken away.

The numeral 1 indicates a horizontal U-shape truck frame constructed from channel bars with a transverse portion of said frame at the front of the machine. Rear wheels 2 are journaled on stub axles 3 on the truck frame 1 and front wheels 4 are journaled on steering knuckles 5 pivotally secured to the front bar of said truck frame. A steering rod 6 connects the knuckles 5 for simultaneous horizontal swinging movement. Pivoted to the intermediate portion of the front bar of the truck frame 1, for horizontal swinging movement, is a draft pole 7, to which pole is pivotally secured the steering rod 6. Obviously, horizontal movements of the pole 7 will impart like movements to the front wheels 4.

The machine may be drawn by draft animals or a tractor attached to the pole 7, or it may be propelled by an engine mounted on the truck frame, with connections to one of the traction wheels.

A shovel plow 8, located under the truck frame 1 and at the front end thereof, is provided with a pair of rearwardly and upwardly extended arms 9. The free ends of these arms 9 are secured to a rock shaft 10, which is extended transversely of the truck frame 1 and journaled in bearing brackets 11, secured to the side bars of said truck frame. The shovel plow 8 is raised and lowered and set in different vertical positions by a latch lever 12 and coöperating lock segment 13, secured to the right hand side bar of the truck frame 1. As shown, the latch lever 12 is keyed to a rock shaft 14 journaled in bearings 15 on the side bars of the truck frame 1. Also keyed to the rock shaft 14 is a pair of relatively short laterally spaced arms 16, which are pivotally connected to the arms 9 by a pair of curved links 17. Obviously, by moving the latch lever 12, the rock shaft 14 may be oscillated to raise and lower the shovel plow 8 through the arm and link connections.

The soil dug up by the shovel plow 8 is delivered onto an elevator 18 of the slat and belt type and having at its marginal edges sprocket chains 19 arranged to run over alined relatively small and large sprockets 20 and 21 respectively. The sprockets 20 are keyed to a shaft 22, journaled in the arms 9 slightly forward of the rear horizontal edge of the shovel plow 8, and the sprockets 21 are keyed to a driven shaft 23 journaled in the bearing brackets 11. An explosive engine, indicated as an entirety by the numeral 24, is provided for driving the shaft 23 by means of a sprocket chain 25, arranged to run over a relatively small sprocket 26, keyed to the engine crank shaft and a relatively large sprocket 27. The engine 24 is mounted on a platform secured to the truck frame 1 and provided with a central passage way through which the elevator 18 works.

From the elevator 18 the soil drops onto an apron 28 supported in any suitable manner and arranged to deliver into the open front end of a horizontally extended drum or oven 29. This drum 29 is rotatively mounted in a skeleton frame 30 with its axis extending longitudinally of the truck frame 1. The frame 30 comprises a pair of vertically extended laterally spaced rectangular head brackets 31 connected at their respective corners by four tie bars 32. Integrally formed with the vertical members of the front head bracket 31 is a pair of diametrically opposite trunnions 33 journaled in the bearing brackets 11. These trunnions 33 permit the rear end of the drum 29 to be raised and lowered for the purpose of changing the inclination of said drum. The rear end of the drum 29 is raised and lowered and held in different set positions. The following connections are provided for this purpose. Integrally formed with the vertical members of the rear head bracket 31 is a pair of racks 34 with which mesh toothed segments 35 journaled in bearings 36 secured to the rear end portions of the side bars of the truck frame 1. The two toothed segments 35 are connected by arch bars 37 for simultaneous oscillatory movements. A latch lever 38 is intermediately fulcrumed on the rock shaft 14 and a coöperating segment 39 is secured to the truck frame 1. The depending end of the latch lever 38 is connected to the arch bar 37 by a long link 40. Obviously, by manipulating the lever 38, the toothed segments 35 may be oscillated to raise or lower, or rather tilt, the frame 30 and, hence, the drum 29.

The drum 29 is supported and rotated within the frame 30 by means of a pair of shafts 41, equipped with pinions 42 that mesh with a pair of external ring gears 43, secured one at each end of said drum. The shafts 41 extend parallel to the axis of the drum 29 and are located in a plane below the horizontal center of said drum. The drum 29 is rotated from the driven shaft 23 by a pair of vertically extended shafts 44 journaled in bearings 45 integrally formed with the bearing brackets 11. Bevel gears 46 are keyed to the ends of the shafts 44. The upper pair of these gears mesh with bevel gears 47 keyed to the driven shaft 23, and the lower pair thereof mesh with bevel gears 48 keyed to the forward ends of the shafts 41.

The drum or oven 29 is heated, as shown, by a pair of burners 49 located at the front of said drum below the apron 28. Fuel is supplied to the burners 49 through a pipe 50, which leads from a supply tank 51 mounted on the truck platform. The fuel within the tank 51 is held under the required pressure by pump 52 actuated by the engine 24 and connected to the tank 51 by a valve equipped pipe 53. A seat 54, for the operator, is mounted on the truck platform just in front of the fuel tank 51 and within easy reach of the levers 12—38. The shafts 41 are journaled in bearings 55 on the head brackets 31.

Operation: The operation of the machine, above described may be briefly described as follows: The plow 8 is preferably set so as to dig up the soil a little deeper than it had been previously plowed. The soil dug up by the shovel plow 8 is delivered onto the elevator 18, carried upward thereby, and discharged onto the apron 28. From the apron 28 the soil rolls or falls into the rotating drum 29. Under the rotation of the drum, the soil is carried upward on one side thereof a certain distance and then falls back on to the lowest surface of the drum 29. This operation is completed a number of times while the soil is gradually working backward toward the end of the drum, owing to the inclination thereof. The soil, during its tumbling action within the drum 29, is finely pulverized, thereby releasing all of the plant growth, insects, etc., held within the soil. As the plant growth is released from the soil, the heat within the drum 29 kills all of the life therein, as well as all of the insects. From the rear of the drum the soil, after having been treated, is again redeposited on the ground.

What we claim is:

In a machine of the kind described, the combination with an imperforate drum, of means for rotating said drum, means for digging up and elevating the soil and delivering the same into the drum, and a burner at the receiving end of the drum for heating the same, through the flame from which burner the soil is precipitated under the rotation of the drum.

In testimony whereof we affix our signatures in presence of two witnesses.

THOMAS KERNAN.
WILLIAM J. ALLEN.

Witnesses:
EVA E. KÖNIG,
HARRY D. KILGORE.